United States Patent [19]

Kubota

[11] 4,385,786
[45] May 31, 1983

[54] HYDRAULIC PRESSURE CONTROL VALVE FOR A DOUBLE PIPING BRAKING SYSTEM

[75] Inventor: Hitoshi Kubota, Fujisawa, Japan

[73] Assignee: Nissan Motor Co., Ltd., Yokohama, Japan

[21] Appl. No.: 202,278

[22] Filed: Oct. 30, 1980

[51] Int. Cl.³ .............................................. B60T 8/26
[52] U.S. Cl. ................................... 303/6 C; 188/349; 303/24 A
[58] Field of Search ................. 303/6 C, 6 R, 24 A, 303/24 C, 24 F, 24 R, 84 A, 84 R, 22 R, 22 A; 188/349, 195

[56] References Cited

U.S. PATENT DOCUMENTS

| 3,627,385 | 12/1971 | Stokes | 303/6 C |
| 4,184,716 | 1/1980 | Kondo | 303/6 C |
| 4,284,307 | 8/1981 | Kubota et al. | 303/24 C X |

FOREIGN PATENT DOCUMENTS

| 2814394 | 10/1979 | Fed. Rep. of Germany . |
| 2930208 | 8/1980 | Fed. Rep. of Germany . |
| 2922984 | 2/1981 | Fed. Rep. of Germany . |
| 2258293 | 8/1975 | France . |
| 2410585 | 6/1979 | France . |
| 2421770 | 11/1979 | France . |
| 2456014 | 12/1980 | France . |
| 1478136 | 6/1977 | United Kingdom . |
| 1487788 | 10/1977 | United Kingdom . |
| 2009347 | 6/1979 | United Kingdom . |
| 2017850 | 10/1979 | United Kingdom . |
| 2018921 | 10/1979 | United Kingdom . |

*Primary Examiner*—Douglas C. Butler
*Attorney, Agent, or Firm*—Thompson, Birch, Gauthier & Samuels

[57] ABSTRACT

In an anti-skid braking system, a first proportioning valve has a plunger which is axially movable in a direction against a spring in response to the application of hydraulic pressure to a first fluid inlet port to control the magnitude of hydraulic pressure at a first fluid outlet port. A second proportioning valve functions to open and close a passage between a second fluid inlet port and a second fluid outlet port. A free-piston is axially movably disposed between the first and second proportioning valves to provide these valves with synchronous opening and closing operations, thereby allowing the second proportioning valve to control the magnitude of a hydraulic pressure at the second outlet port in response to the application of a hydraulic pressure to the second fluid inlet port.

4 Claims, 3 Drawing Figures

HYDRAULIC PRESSURE CONTROL VALVE FOR A DOUBLE PIPING BRAKING SYSTEM

BACKGROUND OF THE INVENTION (1) Field of the Invention

The present invention relates in general to an antiskid braking system for a motor vehicle, and more particularly to a hydraulic pressure control valve assembly for a so-called double piping braking system which functions to control the increase from input to output hydraulic pressure therein.

(2) Description of the Prior Art

A double piping braking system comprising two braking systems is commonly used in motor vehicles due to its higher dependability. In such a system, the following two arrangements are usually used: (1) an arrangement in which the braking system is so constructed that the hydraulic pressure from one of the outlets of a tandem master cylinder is supplied to the right-front wheel brake cylinder and the left-rear wheel brake cylinder and the pressure from the other outlet is supplied to the left-front wheel brake cylinder and the right-rear wheel brake cylinder, and (2) an arrangement in which two brake cylinders are provided on each front wheel and the braking system is so constructed that the hydraulic pressure from one of the outlets of the master cylinder is supplied to one of the respective right and left front wheel brake cylinders and the left-rear brake cylinder, and the pressure from the other outlet is supplied to the other of the respective right and left front wheel brake cylinders and the right-wheel brake cylinder.

The former arrangement is known as X-piping and the latter as J-J piping. In either piping arrangement, it is necessary to provide a hydraulic pressure control valve assembly, such as a limiting valve assembly or a proportioning valve assembly, in the respective hydraulic pressure supply lines to the rear wheel brake cylinders to compensate for the effective weight transfer of the motor vehicle during braking. Therefore, the conventional double piping brake system requires two hydraulic pressure control valve assemblies. This causes disadvantages from the standpoint of mounting space and vehicle assembly.

Acordingly, there has been previously proposed a single valve assembly for the double piping braking system wherein a pair of proportioning valve assemblies performing the respective hydraulic pressure control functions for the rear wheel braking systems are arranged in a common housing parallel to each other, the respective plunger members of the valve assemblies being biased by a common spring acting on a common spring seat.

In such a valve assembly, however, it is necessary to use a stronger, and thus larger, spring as the common spring, since the spring is compelled to bias the paired proportioning valves in a direction to open them for achieving the desired hydraulic pressure control. The use of such a larger spring not only increases the size of the valve assembly itself, but also increases the mechanical force to overcome the spring, which necessitates strength at a portion to which the spring is engaged.

In such a valve assembly, a measure has been employed in which, when one braking system fails to operate, the entire biasing force produced by the common spring is applid to the proportioning valve of the other braking system to increase the critical hydraulic pressure of the proportioning valve of the other braking system for supplying one of the rear wheel brake cylinders with increased hydraulic pressure. However, it has been recognized that even when such a measure is used in the valve assembly, sufficient braking force for effectively braking the motor vehicle is not produced when one braking system fails to operate.

In both proportioning valves, the critical hydraulic pressure determined by the force of the common spring is constant, thereby making the front and rear wheel brake pressure distribution characteristic constant. However, as is known in the art, in order to obtain an ideal distribution characteristic of the front and rear wheel braking force that enables the front and rear wheels to lock simultaneously, the braking force distribution should vary with change of vehicle weight, and the critical hydraulic pressure should increase with an increase of vehicle weight. In this sense, the hydraulic pressure control valve assembly of the above-mentioned type is not suitable for large-sized trucks and the like, the weight of which varies greatly depending on whether they are empty or loaded.

The present invention is thus presented to eliminate the above-mentioned drawbacks encountered in the conventional valve assembly for the double piping braking system.

SUMMARY OF THE INVENTION

According to the present invention, there is provided a hydraulic pressure control valve assembly for a double piping braking system of a wheeled vehicle. The valve assembly comprises a first proportioning valve having a plunger which is axially movable in a direction against a spring in response to the application of hydraulic pressure to a first fluid inlet port to control the magnitude of hydraulic pressure at a first fluid outlet port, a second proportioning valve functioning to open and close a passage between a second fluid inlet port and a second fluid outlet port, and a free-piston axially movably disposed between the first and second proportioning valves to provide these valves with synchronous opening and closing operations, thereby allowing the second proportioning valve to control the magnitude of hydraulic pressure at the second fluid outlet port in response to the application of hydraulic pressure to the second fluid inlet port.

It is an object of the present invention to provide a compact hydraulic pressure control valve assembly for a double piping braking system.

It is another object of the present invention to provide a hydraulic pressure control valve assembly for a double piping braking system which assembly contains a fail-safe means constructed so that when one braking system falls to operate, the other braking system operates in such a manner that the master cylinder hydraulic pressure is directly applied to one of the front wheel brake cylinders as well as to one of the rear wheel brake cylinders.

It is a still another object of the present invention to provide a hydraulic pressure control valve assembly for a double piping braking system, which assembly is equipped with a deceleration sensing valve by which the characteristic of the rear wheel brake pressure of the two brake systems is ideally controlled in accordance with the vehicle weight.

DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
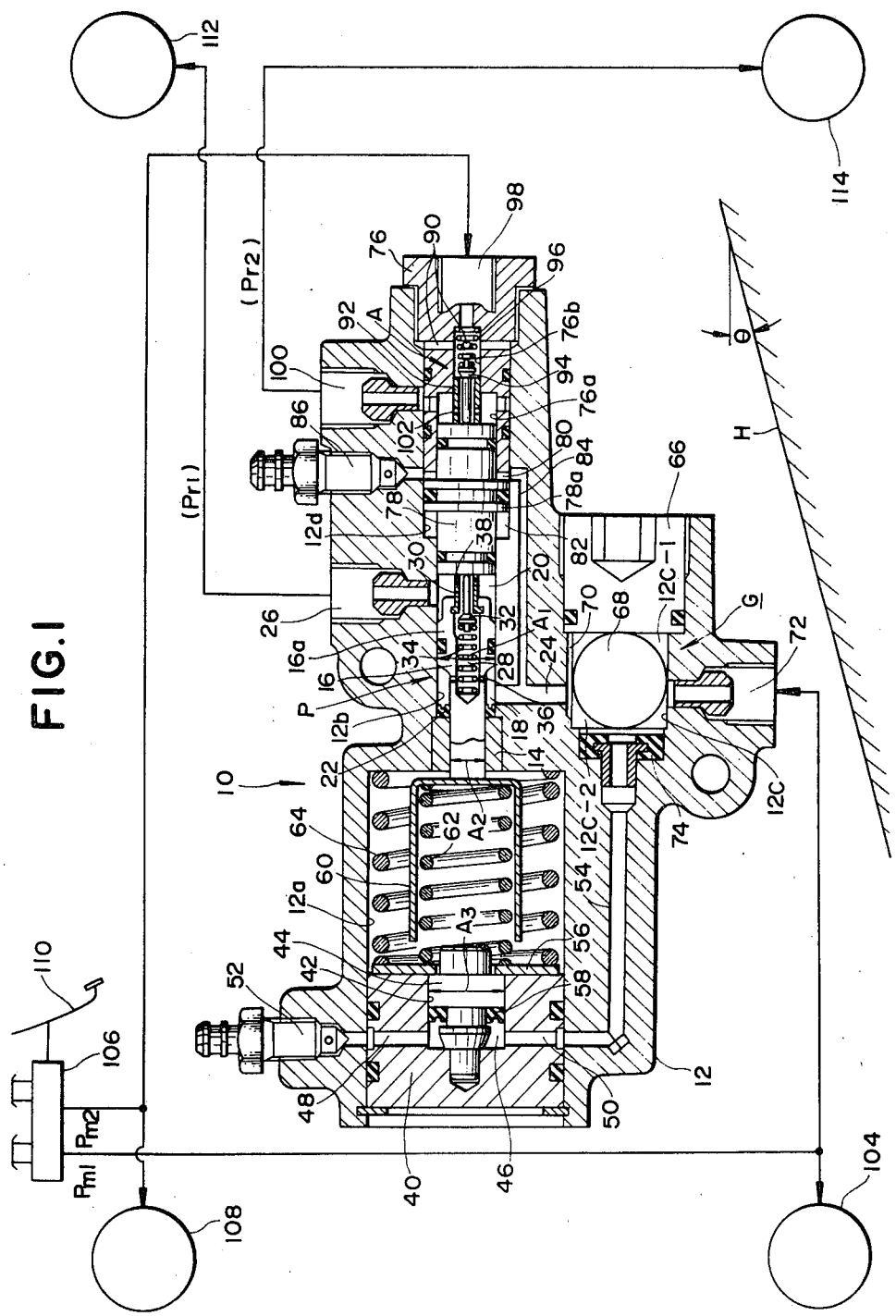
FIG. 1 is a sectional view of a hydraulic pressure control valve assembly of the present invention, showing the location of the valve assembly in a motor vehicle double piping hydraulic braking system.

Referring to FIG. 1 of the drawings, there is shown a hydraulic pressure control valve assembly according to the present invention, which is generally designated by numeral 10. As will be described in detail hereinafter, the valve assembly 10 includes in its housing 12 a first proportioning valve P, a deceleration sensing valve G, and a second proportioning valve A.

The housing 12 has a cylindrical chamber 12a of larger diameter, a cylindrical chamber 12b of smaller diameter aligned and communicating with the chamber 12a, and another cylindrical chamber 12c arranged parallel to the chamber 12b. For the purpose which will become clear hereinafter, the housing 12 further has a cylindrical chamber 12d which is aligned with and communicates with the chamber 12b. As is seen from the drawing, the diameter of the chamber 12d is slightly larger than that of the chamber 12b so that the chambers 12a, 12b and 12d constitute an elongated stepped bore in the housing 12.

The first proportioning valve P (which will hereinafter be referred to as the P-valve) comprises a retainer 14 seated in the chamber 12b near the chamber 12a. Slidably guided by the retainer 14 to be axially movable in the chamber 12b is a plunger 16 which has a land 16a by which the chamber 12b is divided into two chamber sections 18 and 20. The chamber section 12b is isolated from the chamber 12a by a seal member 22, but communicates with the chamber 12c by a passage 24. The other chamber section 20 is connected to an outlet port 26 formed in the housing 12.

The plunger 16 is formed at its right section with a blind hole 28. Fixed to the open end of the blind hole 28 is a valve seat 30, toward which a poppet valve 32 is biased by a spring 34 disposed in the blind hole. The length of the stem part of the poppet valve 32 is selected so that the stem part projects from the right end of the valve seat 30 upon closure of the poppet valve. The plunger 16 has holes 36 for communication between the blind hole 28 and the chamber section 18, and the valve seat 30 has holes 38 for communication between the interior of the valve seat and the other chamber section 20.

The left hand open end of the chamber 12a is closed by a plug 40 which has at its right hand section a blind hole 42 opening to the chamber 12a. A piston 44 is sealingly slidably disposed in the blind hole 42 to define between the piston 44 and the bottom of the hole 42 an operating chamber 46. Two passages 48 and 50 are formed in the plug 40 to extend radially outwardly from the operating chamber 46. An air bleed valve 52 is screwed to the housing 12 to communicate with the passage 48. A passage 54 is formed in the housing 12 to connect the passage 50 with the chamber 12c.

A disc-like spring seat 56 is secured to the piston 44 to axially move in the chamber 12a in response to the axial movement of the piston 44 in the blind chamber 42. A seal member 58 is connected to the piston 44 to isolate the operating chamber 46 from the chamber 12a. A spring seat 60 in the form of a cup is coaxially disposed in the chamber 12a with the bottom wall secured to the left hand end of the plunger 16. A spring 62 is arranged and compressed between the spring seat 56 and the bottom wall of the cup-shaped spring seat 60. Another spring 64 is disposed about the cup-shaped spring seat 60 and compressed between the spring seat 56 and the bottom wall of the chamber 12a to press the spring seat 56 against the plug 40.

Next, the deceleration sensing valve G (which will be referred to hereinafter as the G-valve) will be described. As is known, the G-valve functions to regulate the magnitude of load applied to the spring 62 in accordance with the degree of deceleration of the vehicle, so that the critical hydraulic pressure provided by the P-valve increases with an increase of vehicle weight.

The right hand open end of the chamber 12c is closed by a plug 66. Within the chamber 12c is slidably movably received a ball 68 which thus divides the chamber 12c into first and second chamber sections 12c-1 and 12c-2. These sections communicate constantly with each other by an axially extending groove 70 formed in the cylindrical wall of the chamber 12c. A fluid inlet port 72 communicating with the chamber 12c is formed in the housing 12. A valve seat 74 is mounted in the right hand open end of the passage 54, on which the ball 68 is to sit when shutting the passage 54.

According to the present invention, a second proportioning valve A is further provided in the housing 12.

Figure 2:
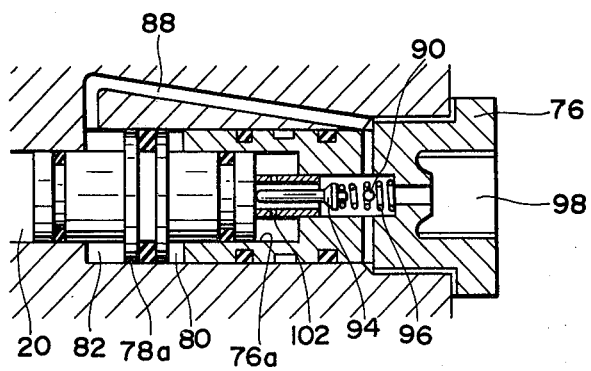
FIG. 2 is an enlarged sectional view of the principal portion of valve assembly of FIG. 1.

The right hand open end of the chamber 12d is closed by an elongate plug 76 which has at its left section a stepped bore including a larger diameter cylindrical chamber section 76a and a smaller diameter cylindrical chamber section 76b. The diameter of the chamber section 76a is the same as that of the chamber 12b. A free piston 78 is sealingly and axially movably disposed in the chamber 12d with its axial ends sealingly slidably received in the right hand section of the chamber 12b and the larger diameter cylindrical chamber section 76a, respectively. As shown, the free piston 78 has at its middle portion a land 78a by which the chamber 12d is divided into two chamber sections 80 and 82 which are isolated from each other. A passage 84 is formed in the housing 12 to connect the chamber section 80 with the passage 24, and an air bleed valve 86 is screwed to the housing 12 to communicate with the chamber section 80. As shown in FIG. 2, another passage 88 is formed in the housing 12 to communicate with the smaller diameter cylindrical chamber section 76b through radially extending holes 90 formed in the plug 76.

Fixed to the open end of the smaller diameter cylindrical chamber section 76b is a valve seat 92 which projects into the larger diameter chamber section 76a. A poppet valve 94 in the chamber section 76b is biased toward the valve seat 92 by a spring 96. The length of the stem part of the poppet valve 94 is selected so that the stem part projects from the left hand end of the valve seat 92 upon closure of the valve 94. It is to be noted that the maximum length of the stem part which projects from the valve seat 92 is equal to that in the case of the afore-mentioned poppet valve 32. It is further to be noted that the additional valve A, including the poppet valve proper 94, the spring 96 and the valve seat 92, has a substantially identical construction and size to the valve P, including the poppet valve proper 32, the spring 34 and the valve seat 30. An inlet port 98 is formed in the plug 76 to connect with the smaller diameter cylindrical chamber section 76b, and an outlet port 100 is formed in the housing 12 to connect with the larger diameter cylindrical chamber section 76a. The valve seat 92 has holes 102 for constant communication between the interior of the seat 92 and the larger chamber section 76a. Upon closing and opening of the poppet valve 94, the communication between the inlet port 98 and the outlet port 100 is closed and open, selectively.

When the control valve assembly 10 of the present invention is mounted on the vehicle body, it is inclined at an angle "$\theta$" with respect to the vehicle axis H so that normally the ball 68 rests on the plug 66 under its own weight, as shown in FIG. 1.

In actual use, the inlet port 72 is connected to both the left-front wheel brake cylinder 104 and one of the outlet ports of a master cylinder 106; the inlet port 98 is connected to both the right-front wheel brake cylinder 108 and the other outlet port of the master cylinder 106. A brake pedal 110 actuates the master cylinder 106 when depressed. The outlet ports 26 and 100 are respectively connected to the right-rear wheel brake cylinder 112 and the left-rear wheel brake cylinder 114. The brakes for the wheels may be of the disc or drum type.

The operation of the control valve assembly 10 of the invention is as follows:

Under inoperative condition wherein the brake pedal 110 is not depressed, the control valve assembly 10 of the present invention assumes a condition as shown in FIG. 1, wherein the work of the spring 62 locates the plunger 16 and the free piston 78 at their rightmost positions, causing both the poppet valves 32 and 94 to open. Opening operation of the poppet valve 32 provides an unblocked fluid circuit (which will be referred to hereinafter as a first fluid circuit) which comprises the inlet port 72, the chamber 12c, the passage 24, the chamber section 18, the holes 36 of the plunger 16, the blind hole 28, the interior of the valve seat 30, the holes 38 of the valve seat 30, the chamber section 20 and the outlet port 26. Opening operation of the poppet valve 94 provides another unblocked fluid circuit (which will be referred to hereinafter as a second fluid circuit) which comprises the inlet port 98, the smaller chamber section 76b of the plug 76, the interior of the valve seat 92, the holes 102 of the seat 92, the larger chamber section 76a of the plug 76 and the outlet port 100. Further, in this condition, the ball 68 is spaced from the valve seat 74 to provide an unblocked fluid circuit (which will be referred to hereinafter as a third fluid circuit) which comprises the inlet port 72, the ball chamber 12c, the passage 54, the passage 50 and the operating chamber 46.

When the brake pedal 110 is depressed to a certain extent to cause the master cylinder 106 to produce hydraulic pressures $Pm_1$ and $Pm_2$ at its outlet ports, the pressures $Pm_1$ and $Pm_2$ are supplied to the left-front wheel brake cylinder 104 and the inlet port 72 of the valve assembly 10, the right-front wheel brake cylinder 108 and the inlet port 98 of the valve assembly 10, respectively. Since the poppet valves 32 and 94 are in their open positions, the pressure $Pm_1$ is applied via the above-mentioned first fluid circuit to the right-rear wheel brake cylinder 112, and the pressure $Pm_2$ is applied via the above-mentioned second fluid circuit to the left-rear wheel brake cylinder 114. Accordingly, in this condition, the master cylinder hydraulic pressures for the rear wheel brake cylinders 112 and 114 increase in the same manner as those for the front wheel brake cylinders 104 and 108. Thus, the rear wheel braking pressure increases with the characteristic shown by line "a-b" in FIG. 3. The balance formula of the force applied to the plunger 16 is as follows:

$$Pm \times A_2 = F \ldots \quad (1)$$

wherein
$P_m$ —Master cylinder hydraulic pressure
$(P_m = Pm_1 = Pm_2)$
$A_2$—Inner hole sectioned area of the retainer 14, and
F—Force generated by the spring 62.

When the master cylinder hydraulic pressure $P_m$ increases due to continuous operation of the brake pedal 110, the left term of the above expression (1) becomes larger. Therefore, the increased force is greater than F, moving the plunger 16 leftward in FIG. 1 against the force of the spring 62.

Under this condition, the free piston 78 is subjected to hydraulic pressures applied to the chamber sections 20, 82, 80 and 76a. However, these hydraulic pressures do not cause movement of the free piston 78. In fact, the pressure receiving area of the free piston 78 exposed to the chamber section 20 is equal to that exposed to the chamber section 76a; the pressure receiving area of the land of the free piston exposed to the chamber section 82 is equal to that exposed to the chamber section 80; the hydraulic pressure $Pr_1$ in the chamber section 20 is equal to the pressure $Pr_2$ in the chamber section 76a; and the hydraulic pressure in the chamber section 82 is equal to that in the chamber section 80.

In response to the leftward movement of the plunger 16, the free piston 78 is shifted leftward by the force of the spring 96 through the poppet valve 94 to a position where the force produced by the spring 96 balances the force produced by the spring 34 through the other poppet valve 32. In other words, during the leftward movement of the plunger 16, the free piston 78 moves leftward at a speed half of that of the plunger 16, permitting the poppet valves 32 and 94 to move relative to their associated valve seats 30 and 92 at the same speed in the directions to close their respective associated circuits. Thus, it will be appreciated that the opening and closing operations of both of the poppet valves 32 and 94 occur at the same time.

When the master cylinder hydraulic pressure Pm continues to increase due to the continuous operation of the brake pedal 110 moving the plunger 16 further leftward, the poppet valves 32 and 94 simultaneously close so that the above-mentioned first and second fluid circuits also close simultaneously. Thus, the hydraulic pressure supply to the rear wheel brake cylinders 112 and 114 is blocked. The hydraulic pressure at this time, that is, the critical hydraulic pressure Ps, is represented by the following equation, corresponding to the above equation wherein Ps is substituted for Pm, $$Ps = (F/A_2) \ldots \quad (2)$$

When the master cylinder hydraulic pressure Pm increases due to the continuous operation of the brake pedal 110, the plunger 16 is moved rightwardly in FIG. 1 with the aid of the spring 62, causing simultaneous opening of the poppet valves 32 and 94, with the result that the master cylinder hydraulic pressure Pm is supplied to the outlet ports 26 and 100, increasing the rear wheel braking pressures $Pr_1$ and $Pr_2$. It should be noted that since the opening and closing operations of the poppet valves 32 and 94 occur simultaneously, the increasing rates of the rear wheel braking pressures $Pr_1$ and $Pr_2$ are equal to each other. Thus, when the rear wheel braking pressures are represented by Pr, it is derived as follows. When Pm is equal to or greater than Ps, that is Pm=Ps, the balance of force applied to the plunger 16 is represented by the following equation:

$$Pr \times A_1 = Pm \times (A_1 - A_2) \ldots \quad (3)$$

wherein $A_1$—Sectional area of the chamber 12b. From the above equation (3), the rear wheel braking hydraulic pressure Pr is derived and represented by the following equation:

$$Pr = \frac{A_1 - A_2}{A_1} \times Pm + \frac{F}{A_1} = m \times Pm + \frac{F}{A_1} \quad (4)$$

wherein $$m = \frac{A_1 - A_2}{A_1}$$

Figure 3:
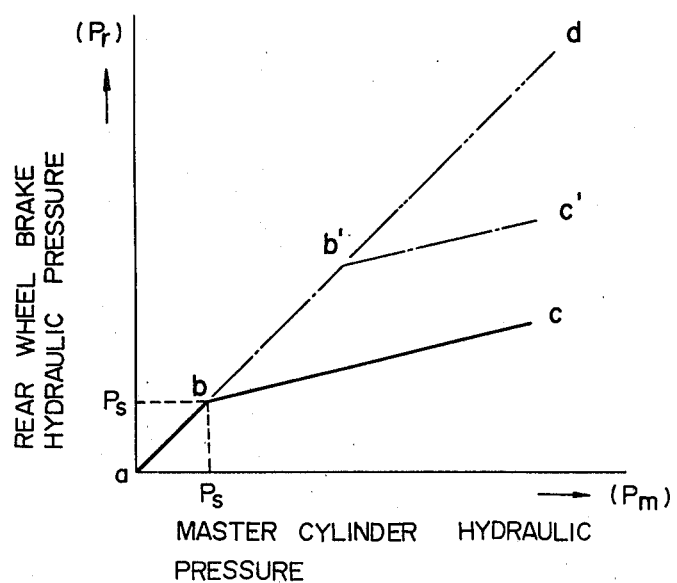
FIG. 3 is a graph depicting the relationship between the input hydraulic pressure fed into the valve assembly of the invention and the corresponding output hydraulic pressure.

As is clear from the above equation (4), when the master cylinder hydraulic pressure Pm becomes higher than the critical hydraulic pressure Pr, the rear wheel braking hydraulic pressure Pr increases at a lower rate, indicated by the slope "m", than that indicated by the slope "1", shown by line "b-c" in FIG. 3, thereby preventing the rear wheels from locking.

During the above-mentioned braking operation, the vehicle is subjected to deceleration. When the deceleration reaches a predetermined value, the ball 68 of the G-valve moves by its inertia leftward in FIG. 1 to seat on the valve seat 74 to close the passage 54, thereby confining the master cylinder hydraulic pressure in the operating chamber 46. As is known, the master cylinder hydraulic pressure which brings about the above-mentioned predetermined deceleration of the vehicle increases as the vehicle weight increases, and thus the confined hydraulic pressure $P_G$ in the operating chamber 46 increases with an increase in vehicle weight. The confined hydraulic pressure $P_G$ is applied to a pressure receiving area $A_3$ of the piston 44 to bias it in the rightward direction in FIG. 1 against the forces produced by the springs 62 and 64. However, when the vehicle is lightly loaded, the confined hydraulic pressure $P_G$ does not reach the value at which the piston 44 begins to move rightward, so that the spring force of the spring 62 is not increased. Thus, the rear wheel braking hydraulic pressure increases with the characteristic indicated by line "a-b-c" in FIG. 3.

On the other hand, when the vehicle is loaded to a certain degree, the confined hydraulic pressure $P_G$ in the operating chamber 46 reaches the predetermined value, at which the piston 44 begins to move rightward against the forces produced by the springs 62 and 64. This increases the spring force of the spring 62, so that the critical hydraulic pressure Pr increases as indicated in the above-mentioned equation (2). In fact, when the vehicle is half loaded, the rear wheel braking hydraulic pressure increases with the characteristic indicated by broken line "a-b'-c'" in FIG. 3, which is substantially the ideal for rear wheel braking hydraulic pressure.

When one braking system including the P-valve fails to operate, no hydraulic pressure is applied to the chamber sections 20 and 80, even when the master cylinder pressure is produced. However, to the chamber sections 82 and 76a, the master cylinder hydraulic pressure is applied through the normally operated second braking system including the additional valve A. In this condition, the free piston 78 is moved rightward by the difference in pressure receiving areas between the free piston's land facing the chamber section 82 and the free piston's right end facing the chamber section 76a, to the position to open the poppet valve 94 of the additional valve A. Thus, under this condition, the passage between the inlet port 98 and the outlet port 100 is kept open, so that the master cylinder hydraulic pressure $Pm_2$ is directly applied to the left-rear wheel brake cylinder 114. Thus, the braking pressure in the left-rear wheel brake cylinder 114 increases with the characteristic shown by line "a-d" in FIG. 3, thereby solving possible problems caused by insufficient braking force.

When the other braking system including the additional braking system fails to operate, no hydraulic pressure is applied to the chamber sections 82 and 76a, even when the master cylinder hydraulic pressure is produced. To the chamber sections 20 and 80, however, the master cylinder hydraulic pressure is applied through the normally operated braking system including the P-valve. In this condition, the free piston 78 is moved leftward, by the difference in pressure receiving areas between the free piston's left end facing the chamber section 20 and the free piston's land facing the chamber section 80, to the position to open the poppet valve 32 of the P-valve. Thus, under this condition, the passage between the inlet port 72 and the outlet port 26 is kept open, so that the master cylinder hydraulic pressure $Pm_1$ is directly applied to the right-rear wheel brake cylinder 112. Thus, the braking pressure in the right-rear wheel brake cylinder 112 increases with the characteristic shown by line "a-d" in FIG. 3.

As should be understood from the above, in the present invention, it is not necessary to use a stronger and larger sized spring 62. Thus, the control valve assembly of the present invention can be compactly constructed.

Further, in the present invention, the characteristic of the rear wheel brake pressure in the two brake systems is ideally controlled in accordance with the vehicle weight. This is achieved by providing a cooperative relationship between the conventionally constructed G-valve and the P-valve.

Further, in the present invention, even when one brake system fails to operate, the other brake system operates in such a manner that the master cylinder hydraulic pressure is directly applied to one of the front wheel brake cylinders as well as to one of the rear wheel brake cylinders, resulting in fail-safe operation of the hydraulic pressure control valve of the present invention.

What is claimed is:

1. A hydraulic pressure control valve assembly for a double piping braking system of a wheeled vehicle, comprising:
   a first proportioning valve (P) having a plunger (16) moving axially against a spring (62) in response to the application of a hydraulic pressure to a first fluid inlet port (72) to control the magnitude of hydraulic pressure at a first fluid outlet port (26), said first plunger (16) having a first poppet valve (32) opening and closing a passage between said first inlet port (72) and said first outlet port (26);

a second proportioning valve (A) having a second poppet valve (94) opening and closing a passage between a second fluid inlet port (98) and a second fluid outlet port (100);

a free-piston (78) having two axial ends, said free piston axially movably disposed between said first and second proportioning valves (P, A) to provide said valves with synchronous opening and closing operations, thereby allowing said second proportioning valve (A) to control the magnitude of hydraulic pressure at said second fluid outlet port (100) in response to the application of hydraulic pressure to said second fluid inlet port (98); and a fail-safe means (98, 20, 82, 80, 76a) constructed and arranged to move said free-piston (78) to a position to open one of said first and second poppet valves (32, 94) upon the failure of operation of the braking system associated with the other of said poppet valves, said fail-safe means including a first chamber section (20) to which said free-piston first axial end is exposed, and with which said first fluid outlet port (26) communicates, a second chamber section (76a) to which said free-piston second axial end is exposed, and with which said second fluid outlet port (100) communicates, a third chamber section (82) to which one face of a land (78a) formed on said free-piston (78) is exposed, and a fourth chamber section (80) to which the opposite face of said land (78a) is exposed, said fourth chamber section (80) communicating with said first fluid inlet port (72), said third chamber section (82) being located between said first and fourth chamber sections (20, 80), and said fourth chamber section (80) being located between said third and second chamber sections (82, 76a).

2. A hydraulic pressure control valve assembly for a double piping braking system of a wheeled vehicle, comprising:

a first proportioning valve (P) having a plunger (16) moving axially against a spring (62) in response to the application of a hydraulic pressure to a first fluid inlet port (72) to control the magnitude of hydraulic pressure at a first fluid outlet port (26), said first plunger (16) having a first poppet valve (32) opening and closing a passage between said first inlet port (72) and said first outlet port (26);

a second proportioning valve (A) having a second poppet valve (94) opening and closing a passage between a second fluid inlet port (98) and a second fluid outlet port (100);

a free-piston (78) having two axial ends, and having a land (78a) formed on said free-piston, said free-piston axially movably disposed between said first and second proportioning valves (P, A) to provide said valves with synchronous opening and closing operations, thereby allowing said second proportioning valve (A) to control the magnitude of hydraulic pressure at said second fluid outlet port (100) in response to the application of hydraulic pressure to said second fluid inlet port (98); and a fail-safe means (98, 20, 82, 80, 76a) constructed and arranged to move said free piston (78) to a position to open one of said first and second poppet valves (32, 94) upon the failure of operation of the braking system associated with the other of said poppet valves, wherein said first proportioning valve plunger (16) has a first poppet valve assembly (32, 30, 34) for engaging said first axial end of said free-piston, said first poppet valve assembly opening the passage between said first fluid inlet port (72) and said first fluid outlet port (26) when said first poppet valve assembly is brought into contact with said free-piston first axial end, and wherein said second proportioning valve (A) has a second poppet valve assembly (94, 92, 96) for engaging said second axial end of said free-piston, said second poppet valve assembly opening the passage between said second fluid inlet port (98) and said second fluid outlet port (100) when said free-piston second axial end is brought into contact with said second poppet valve assembly, and wherein said fail-safe means comprises a first chamber section (20) to which said free-piston first axial end is exposed, and with which said first fluid outlet port (26) communicates, a second chamber section (76a) to which said free-piston second axial end is exposed, and with which said second fluid outlet port (100) communicates, a third chamber section (82) to which one face of said land (78a) is exposed, and a fourth chamber section (80) to which the opposite face of said land (78a) is exposed, said fourth chamber section (80) communicating with said first fluid inlet port (72), said third chamber section (82) being located between said first and fourth chamber sections (20, 80), and said fourth chamber section (80) being located between said third and second chamber sections (82, 76a).

3. A hydraulic pressure control valve assembly as claimed in claim 2, further comprising a deceleration sensing valve responsive to vehicle deceleration, said deceleration sensing valve having a piston supporting an end of said spring, said deceleration sensing valve piston being sealingly disposed in a chamber to define therein a sealed expandable operating chamber, said chamber selectively communicating with said first fluid inlet port to contain therein a fluid, the pressure of which varies in accordance with the degree of vehicle deceleration.

4. A hydraulic pressure control valve assembly as claimed in claim 2, in which said first and second poppet valves are constructed identical to each other.

* * * * *